(12) United States Patent
Lee et al.

(10) Patent No.: US 8,283,091 B2
(45) Date of Patent: Oct. 9, 2012

(54) METHOD OF PREPARING A NANOFIBER AND A FUEL CELL INCLUDING THE NANOFIBER

(75) Inventors: Jeong-hee Lee, Yongin-si (KR);
Jae-young Choi, Yongin-si (KR);
Chan-ho Pak, Yongin-si (KR); Eun-ju Ra, Seoul (KR); Young-hee Lee, Seoul (KR); Kay-hyeok An, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/200,256

(22) Filed: Sep. 21, 2011

(65) Prior Publication Data

US 2012/0046434 A1 Feb. 23, 2012

Related U.S. Application Data

(62) Division of application No. 11/985,531, filed on Nov. 14, 2007, now Pat. No. 8,084,167.

(30) Foreign Application Priority Data

Jan. 24, 2007 (KR) .................. 10-2007-0007643
Oct. 12, 2007 (KR) .................. 10-2007-0103168

(51) Int. Cl.
*H01M 4/02* (2006.01)

(52) U.S. Cl. ........ 429/523; 429/530; 429/533; 429/555; 977/948

(58) Field of Classification Search .................. 429/523, 429/530, 533, 535; 526/341; 977/948
See application file for complete search history.

(56) References Cited

U.S. PATENT DOCUMENTS

| | | | |
|---|---|---|---|
| 5,456,897 A | 10/1995 | Moy et al. | |
| 5,861,454 A | 1/1999 | Ikeda et al. | |
| 5,866,434 A | 2/1999 | Massey et al. | |
| 6,203,814 B1 | 3/2001 | Fisher et al. | |
| 7,125,822 B2 | 10/2006 | Nakano et al. | |
| 2003/0008772 A1 | 1/2003 | Ma et al. | |
| 2003/0086858 A1* | 5/2003 | Niu et al. | 423/447.1 |
| 2005/0224999 A1* | 10/2005 | Andrady et al. | 264/10 |
| 2007/0036978 A1* | 2/2007 | Chen | 428/408 |
| 2008/0149561 A1 | 6/2008 | Chu et al. | |
| 2009/0072192 A1* | 3/2009 | Seal et al. | 252/182.33 |

OTHER PUBLICATIONS

Sanli, O., "*Homogeneous Hydrolysis of Polyacrylonitrile by Potassium Hydroxide*", Eur. Polym. J. vol. 26, No. 1, pp. 9-13, 1990.

* cited by examiner

*Primary Examiner* — Raymond Alejandro
(74) *Attorney, Agent, or Firm* — Christie, Parker & Hale, LLP

(57) ABSTRACT

Provided is a carbon nanofiber, wherein the carbon nanofiber has a surface oxygen content of at least 0.03 calculated by the formula: Oxygen content=[atomic percentage of oxygen/atomic percentage of carbon] using atomic percentages of oxygen and carbon, respectively calculated from an area of an oxygen peak having a binding energy of 524 to 540 eV, an area of a nitrogen peak having a binding energy of 392 to 404 eV, and an area of a carbon peak having a binding energy of 282 to 290 eV in X-ray photoelectron spectroscopy. The nanofibers have high surface oxygen content and may have metal catalyst nano particles densely and uniformly distributed on the outer wall of the carbon nanofibers, thereby having high electrochemical efficiency.

11 Claims, 14 Drawing Sheets
(1 of 14 Drawing Sheet(s) Filed in Color)

US 8,283,091 B2

METHOD OF PREPARING A NANOFIBER AND A FUEL CELL INCLUDING THE NANOFIBER

CROSS-REFERENCE TO RELATED PATENT APPLICATION

This application is a divisional of 11/985,531 filed Nov. 14, 2007, which issued as U.S. Pat. No. 8,084,167 on Dec. 27, 2011, and which claims priority to and the benefit of Korean Patent Application No. 10-2007-0007643, filed on Jan. 24, 2007, in the Korean Intellectual Property Office and Korean Patent Application No. 10-2007-0103168, filed on Oct. 12, 2007, in the Korean Intellectual Property Office the disclosures of which are incorporated herein in their entirety by reference.

BACKGROUND OF THE INVENTION

1. Field of the Invention

The present invention relates to a carbon nanofiber for a fuel cell electrode, a nanocomposite for a fuel cell, a method of preparing the carbon nanofiber and the nanocomposite, an electrode including the nanocomposite, and a fuel cell including an electrode having the nanocomposite.

2. Description of the Related Art

Recently, research has been conducted into fuel cells as power sources for vehicles and electronic devices due to increasing concerns regarding environmental problems in burning fossil fuels and exhaustion of natural resources.

Fuel cells are devices that convert energy stored in fuel to electrical energy through electrochemical reactions between the fuel and oxidizing gas. Fuel cells can be classified into solid oxide fuel cells that operate at 1000° C. using a solid oxide, molten carbonate fuel cells that operate at 500 to 700° C., phosphoric acid fuel cells that operate at about 200° C., alkali electrolyte fuel cells that operate at room temperature to about 100° C., polymer electrolyte membrane fuel cells, and the like.

Polymer electrolyte fuel cells include proton exchange membrane fuel cells (PEMFCs) that use hydrogen gas as a fuel, direct methanol fuel cells (DMFCs) that directly supply liquid methanol as a fuel to an anode. PEMFCs, which are regarded as providing next generation clean power that can replace power sources that rely on fossil fuel, have high power density and a high energy conversion rate. Further, PEMFCs can operate at room temperature and can be easily miniaturized and sealed so that they can be used for various applications, such as electric vehicles, domestic energy generating systems, mobile communications equipment, medical equipment, military and space equipment, and business equipment.

PEMFCs as power generating systems that generate direct current electricity from electrochemical reactions between hydrogen and oxygen, and include an anode, a cathode, and a proton exchange membrane between the anode and the cathode.

The proton exchange membrane is formed of a solid polymer such as Nafion that has high proton conductivity and that is impermeable to unreacted gases. Each of the anode and the cathode respectively includes a supporting layer to supply reactant gases or liquids and a catalyst layer in which oxidation/reduction of reactant gases occur.

In PEMFCs having the structure described above, hydrogen is supplied as the reactant gas to the anode where it is oxidized to convert hydrogen atoms into hydrogen ions and electrons. The hydrogen ions are conducted to the cathode across the proton exchange membrane.

Reduction reactions occur at the cathode where oxygen atoms receive electrons and are converted to oxygen ions which react with the hydrogen ions conducted from the anode across the proton exchange membrane to generate water.

Each of the anode and the cathode of the PEMFC includes a gas diffusion layer (GDL). Catalyst layers for promoting the chemical reactions in fuel cells are formed on supporting layers made of carbon cloth or carbon paper.

Direct Methanol Fuel Cells (DMFCs) having structures similar to PEMFCs supply liquid methanol as a reactant instead of hydrogen to the anode where the methanol is oxidized by a catalyst to produce hydrogen ions, electrons and carbon dioxide. While DMFCs have lower cell efficiency than PEMFCs, they can be more easily applied to portable electronic devices due to their use of a liquid fuel.

Research into electrodes, fuels, and electrolyte membranes has been actively conducted to improve power density and power output by increasing energy density in fuel cells. In particular, attempts have been made to improve activity of a catalyst used in the electrodes.

A metal such as Pt, Pd, Rh or Ru, or an alloy of Pt and other metals is generally used as the catalyst in PEMFCs and DMFCs. To be cost-effective, reduced amounts of the metal catalyst are desired.

Thus, as a method of reducing the amount of the catalyst while maintaining or improving the performance of fuel cells, a method of using a conductive carbon material having a large surface area as a support by dispersing Pt, or the like into micro particles to enlarge the surface area of the catalyst metal is used.

Typically, a catalyst formed of Pt is prepared in a paste form and uniformly coated on a porous carbon support. However, the degree of dispersion of the catalyst is not uniform in the carbon support.

SUMMARY OF THE INVENTION

The present invention provides a carbon nanofiber for a fuel cell electrode having a high surface oxygen content.

The present invention also provides a method of preparing the carbon nanofiber for a fuel cell electrode.

The present invention also provides a nanocomposite for a fuel cell electrode.

The present invention also provides a method of preparing the nanocomposite for a fuel cell electrode.

The present invention also provides an electrode and a fuel cell including the nanocomposite.

The present invention also provides a fuel cell including an electrode having the nanocomposite.

According to an aspect of the present invention, there is provided a carbon nanofiber for a fuel cell electrode having a surface oxygen content of at least 0.03, calculated using Formula 1 using atomic percentages of oxygen and carbon, respectively calculated from an area of an oxygen peak having a binding energy from 524 to 540 eV, an area of a nitrogen peak having a binding energy from 392 to 404 eV, and an area of a carbon peak having a binding energy from 282 to 290 eV in X-ray photoelectron spectroscopy:

$$\text{Oxygen content} = [\text{atomic percentage of oxygen/atomic percentage of carbon}] \quad \text{Formula 1}$$

According to another aspect of the present invention, there is provided a method of preparing a carbon nanofiber for a fuel cell electrode, the method comprising: hydrolyzing a surface of a carbon nanofiber precursor with a hydroxide solution having a concentration from 0.0001-1 M to form a hydrolyzed carbon nanofiber precursor; washing the hydrolyzed carbon nanofiber precursor with a hydrochloric acid solution; and sintering the washed carbon nanofiber precursor to obtain a carbon nanofiber.

According to another aspect of the present invention, there is provided a nanocomposite for a fuel cell electrode including: a carbon nanofiber; and metal catalyst particles uniformly applied to the surface of the carbon nanofiber, wherein the carbon nanofiber has a surface oxygen content of at least 0.03, calculated using Formula 1 using atomic percentages of oxygen and carbon, respectively calculated from an area of an oxygen peak having a binding energy from 524 to 540 eV, an area of a nitrogen peak having a binding energy from 392 to 404 eV, and an area of a carbon peak having a binding energy from 282 to 290 eV in X-ray photoelectron spectroscopy:

Oxygen content=[atomic percentage of oxygen/atomic percentage of carbon]   Formula 1

According to another aspect of the present invention, there is provided a method of preparing a nanocomposite for a fuel cell electrode, the method comprising: hydrolyzing a surface of a carbon nanofiber precursor with a hydroxide solution having a concentration from 0.0001-1 M to form a hydrolyzed carbon nanofiber precursor; applying a metal catalyst precursor to the surface of the hydrolyzed carbon nanofiber precursor; and sintering the carbon nanofiber precursor to which the metal catalyst precursor has been applied.

According to another aspect of the present invention, there is provided an electrode for a fuel cell comprising the nanocomposite.

According to another aspect of the present invention, there is provided a fuel cell comprising an electrode having the nanocomposite.

The nanocomposite according to the present invention has high surface oxygen content compared to conventional composite material, and metal catalyst nano particles are uniformly distributed on the outer walls of the carbon nanofiber in the nanocomposite, thereby having high electrochemical efficiency. Thus, efficiency of fuel cells can be improved using the nanocomposite.

BRIEF DESCRIPTION OF THE DRAWINGS

The patent or application file contains at least one color drawing executed in color. Copies of this patent or patent application with color drawing(s) will be provided by the Office upon request and payment of the necessary fee.

The above and other features and advantages of the present invention will become more apparent by describing in detail exemplary embodiments thereof with reference to the attached drawings in which.

DETAILED DESCRIPTION

Figure 1:
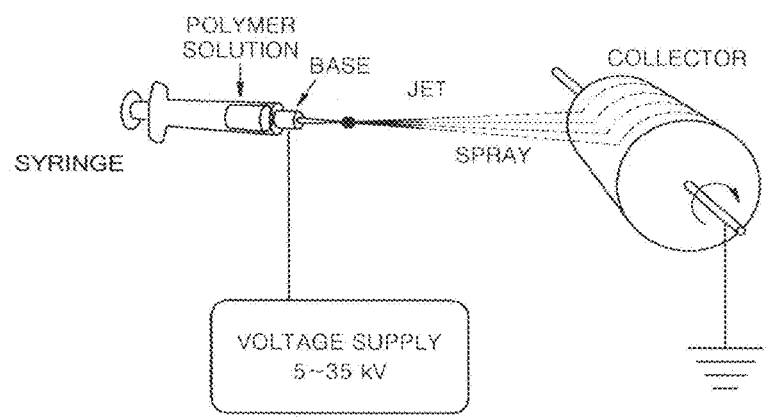
FIG. 1 is a schematic diagram for illustrating an electrospinning method according to an embodiment of the present invention.

Hereinafter, the present invention will be described more fully with reference to the accompanying drawings, in which exemplary embodiments of the invention are shown. However, the invention may be embodied in many different forms and should not be construed as being limited to the embodiments set forth herein. Rather, these embodiments are provided so that this disclosure will be thorough and complete, and will fully convey the concept of the invention to those skilled in the art.

A carbon nanofiber for a fuel cell electrode has a surface oxygen content of at least 0.03, calculated using Formula 1 using atomic percentages of oxygen and carbon, respectively calculated from an area of an oxygen peak having a binding energy from 524 to 540 eV, an area of a nitrogen peak having a binding energy from 392 to 404 eV, and an area of a carbon peak having a binding energy from 282 to 290 eV in X-ray photoelectron spectroscopy.

Oxygen content=[atomic percentage of oxygen/atomic percentage of carbon]   Formula 1

The surface oxygen content of the carbon nanofiber may be from 0.03 to 0.2, and preferably higher than 0.03 and less than 0.2. Such a high surface oxygen content is obtained by hydrolysis with a hydroxide solution. The carbon nanofiber having a high surface oxygen content has excellent wettability and a number of electrophilic sites. Thus, the carbon nanofiber can combine with a large number of cations of metal per unit area of the carbon nanofiber, and efficiently applied to various electrochemical catalysts as a conductive support.

In particular, since the carbon nanofiber does not need additional binder and ionomer to introduce a metal catalyst, conductivity is not decreased.

The present invention provides a method of a carbon nanofiber for a fuel cell electrode, the method including: hydrolyzing a surface of a carbon nanofiber precursor with a hydroxide solution having a concentration from 0.0001-1 M to form a hydrolyzed carbon nanofiber precursor (hydrolysis operation); washing the hydrolyzed carbon nanofiber precursor with a hydrochloric acid solution (washing operation); and sintering the washed carbon nanofiber precursor to obtain a carbon nanofiber (sintering operation).

The concentration of the hydroxide solution may be from 0.05 to 0.5 M

The carbon nanofiber precursor may be prepared using an electrospinning method.

The method may further include stabilizing the carbon nanofiber precursor by heat-treatment at a temperature between 200 and 300° C. under an oxygen-containing atmosphere for 1 to 2 hours prior to the hydrolysis.

The carbon nanofiber precursor may include at least one polymer selected from the group consisting of a polyacrylonitrile (PAN)-based polymers, acryl-based polymers, pitch-based polymers, and phenol-based polymers.

The concentration of the hydroxide solution may be from 0.05 to 0.5 M, and the temperature of the hydroxide solution may be between 30 and 60° C. The hydrolysis of the surface of the carbon nanofiber precursor may be performed for from 10 minutes to 10 hours.

The hydroxide compound may be of the formula of MOH, where M is at least one metal selected from the group consisting of Group IA, Group IIA, Group IIA, Group IVA, Group VA, Group VIA, Group VIIA, Group VIII, Group IB, Group IIB and Group IIIB elements, and preferably KOH, LiOH, or NaOH.

The sintering may be performed in an inert atmosphere and at a temperature between 500 and 1500° C.

More characteristics of the method of preparing the carbon nanofiber will be described in more detail with reference to the nanocomposite.

A nanocomposite for a fuel cell electrode of the present invention includes: a carbon nanofiber; and metal catalyst particles uniformly applied to the surface of the carbon nanofiber, wherein the carbon nanofiber has a surface oxygen content of at least 0.03, calculated using Formula 1 below using atomic percentages of oxygen and carbon, respectively calculated from an area of an oxygen peak having a binding energy of 524 to 540 eV, an area of a nitrogen peak having a binding energy of 392 to 404 eV, and an area of a carbon peak having a binding energy of 282 to 290 eV in X-ray photoelectron spectroscopy.

Oxygen content=[atomic percentage of oxygen/atomic percentage of carbon]     Formula 1

According to one embodiment, the surface oxygen content of the nanocomposite for fuel cells is in the range of 0.03 to 0.2.

An embodiment of the present invention provides a nanocomposite for a fuel cell electrode in which nano-sized metal catalyst particles of a metal catalyst for an electrode for fuel cells are uniformly dispersed on the surface of the carbon nanofiber.

Such a high surface oxygen content is obtained by hydrolysis with a hydroxide solution. The carbon nanofiber having a high surface oxygen content has excellent wettability and a number of electrophilic sites. Thus, the metal catalyst particles are uniformly dispersed on the surface of the carbon nanofiber. Since the carbon nanofiber can combine with a large number of nano-sized metal catalyst particles per unit area of the carbon nanofiber, it can be efficiently applied as various electrochemical catalysts.

In particular, since the nanocomposite does not need additional binder and ionomer to introduce a metal catalyst, conductivity is not decreased.

According to an embodiment of the present invention, an average particle size of the metal catalyst for an electrode of fuel cells may be in the range of 2 to 5 nm. When the average particle size of the metal catalyst is greater than 5 nm, the metal catalyst may be uneconomical and inefficiently used. When the average particle size of the metal catalyst is less than 2 nm, catalyst activity may be reduced. Furthermore, in an embodiment of the invention, the sizes of the individual particles of the metal catalyst are fairly uniform with small variation in the standard deviation of the average particle size.

The metal catalyst particles for fuel cells according to an embodiment of the invention may be formed of a metal such as platinum, palladium, rhodium, ruthenium, an alloy thereof, or the like.

As the surface area of the metal catalyst increases, the amount of metal catalyst per unit area on the surface of the carbon nanofiber increases, resulting in improved fuel cell efficiency.

The nanocomposite may be provided in a web or paper form. If the nanocomposite is in a web or paper form, conductivity is improved since an additional organic binder is not required during manufacture.

In addition, a method of preparing a nanocomposite for fuel cells according to an embodiment of the present invention includes: hydrolyzing a surface of a carbon nanofiber precursor with a hydroxide solution having a concentration from 0.0001-1 M to form a hydrolyzed carbon nanofiber precursor (hydrolysis operation); applying a metal catalyst precursor to the surface of the hydrolyzed carbon nanofiber precursor (catalyst applying operation); and sintering the carbon nanofiber precursor to which the metal catalyst precursor has been applied (sintering operation).

According to an embodiment, in the hydrolysis, the surface of the carbon nanofiber precursor is put in contact with a low-concentration solution containing hydroxide ions. Then, polar functional groups such as a nitrile groups on the surface of the carbon nanofiber precursor react with the hydroxyl groups to form amide groups, carboxyl groups, carbonyl groups, or the like, thereby increasing oxygen content on the surface of the carbon nanofiber precursor. Finally, the carbon nanofiber precursor is carbonized during the sintering process to prepare a nanocomposite including the carbon nanofiber and the metal catalyst.

The carbon nanofiber precursor may be prepared using various methods, and in one embodiment, is prepared using an electrospinning method. The voltage applied for the electrospinning method may be in the range of 5 to 35 kV.

The carbon nanofiber precursor prepared using the electrospinning method may be stabilized using a heat-treatment process at a temperature in the range of 200 to 300° C. under an oxygen-containing atmosphere for 1 to 2 hours prior to the hydrolysis.

The carbon nanofiber precursor used in the method of preparing the nanocomposite may be formed using at least one polymer selected from the group consisting of a polyacrylonitrile (PAN)-based polymer, an acryl-based polymer, a pitch-based polymer, and a phenol-based polymer. In a preferred embodiment, a PAN-based polymer is used.

The concentration of the hydroxide solution may be in the range of 0.0001 to 1 M, and preferably is from 0.05 to 0.5 M. When the concentration of the hydroxide solution is less than 0.0001 M, the hydrolysis rate may decrease. When the concentration of hydroxide solution is greater than 1 M, the surface of the carbon nanofiber precursor may have defects. These effects can be observed with reference to X-ray photoelectron spectroscopy in Evaluation Example 2 and FIGS. 6C and 6D.

In preparing the nanocomposite according to an embodiment of the present invention, the temperature of the hydroxide solution may be in the range of 30 to 60° C. When the temperature of the hydroxide solution is higher than 60° C., corrosion of the carbon nanofiber precursor may increase. When the temperature of the hydroxide solution is less than 30° C., the hydrolysis rate of the surface of the carbon nanofiber precursor may decrease.

In an embodiment of the invention, the hydrolysis of the surface of the carbon nanofiber precursor may be performed for 10 minutes to 10 hours. When the hydrolysis is performed for longer than 10 hours, corrosion of the carbon nanofiber precursor may increase. When the hydrolysis is performed for less than 10 minutes, the hydrolysis rate may decrease.

In preparing the nanocomposite according to an embodiment of the present invention, the hydroxide solution is of the general formula MOH, where M is at least one metal selected from the group consisting of Group IA, Group IIA, Group IIIA, Group IVA, Group VA, Group VIA, Group VIIA, Group VIII, Group IB, Group IIB and Group IIIB elements.

In certain embodiments, the hydroxide solution is selected from KOH, LiOH, and NaOH.

In preparing the nanocomposite according to an embodiment of the present invention, the attachment of the metal catalyst precursor to the surface of the hydrolyzed and washed carbon nanofiber precursor may be performed using one of a dipping method, a spray method, a spin-coating method and a dropping method.

The metal catalyst precursor may be an organic salt or an inorganic salt of at least one metal selected from the group consisting of platinum, palladium, rhodium, ruthenium and alloys thereof.

In embodiments of the invention, the platinum precursor may be selected from platinum(II) 2,4-pentanedionate, platinum bisacetylacetonate, tetraammineplatinum acetate, $H_2PtCl_2$, and the like, the palladium precursor may be selected from tetraamminepalladium acetate, palladium bisacetylacetonate, and the like, the rhodium precursor may be selected form rhodium acetate, rhodium trisacetylacetonate, and the like, the ruthenium precursor may be selected from ruthenium acetate, ruthenium trisacetylacetonate, and the like, and the iridium precursor may be selected from chloro iridic acid, chloro biscyclooctyne iridium dimer, and the like.

If more than one metal is selected from the group consisting of platinum, palladium, rhodium, ruthenium, and iridium, a mixture of the precursors described above may be used.

In preparing a nanocomposite according to an embodiment of the invention, the sintering of the carbon nanofiber precursor to which the metal catalyst precursor is attached may be performed in an inert atmosphere. The sintering temperature may be a temperature at which the carbon nanofiber precursor is carbonized, and a preferred temperature range is from 500 to 1500° C.

In an embodiment, the method of preparing the nanocomposite may further include washing the hydrolyzed carbon nanofiber precursor with a hydrochloric acid solution after the hydrolysis of the surface of the carbon nanofiber precursor.

The concentration of the hydrochloric acid solution used in the washing of the hydrolyzed carbon nanofiber precursor may be in the range of 0.01 to 5 M. When the concentration of the hydrochloric acid solution is greater than 5 M, corrosion of the hydrolyzed carbon nanofiber precursor may occur. When the concentration of the hydrochloric acid solution is less than 0.01 M, the hydrolyzed carbon nanofiber precursor may be inefficiently washed.

The present invention provides an electrode for a fuel cell including a nanocomposite.

The nanocomposite according to an embodiment of the invention can be used as an electrode for a fuel cell. Alternatively, the nanocomposite may be used as a catalyst layer or a diffusion layer of a fuel cell, or in an integrated electrode comprising a catalyst layer and a diffusion layer. The use of the nanocomposite in an integrated electrode may help to prevent a reduction in the electrical conductivity of the electrode since it does not require formation of an additional catalyst layer that is prepared by mixing a catalyst, a catalyst support, and an organic binder. When the nanocomposite is used as the catalyst layer, carbon cloth or carbon paper may be used for the support layer. Since the electrode does not need additional binder and ionomer to introduce a metal catalyst, conductivity is not decreased The present invention provides a fuel cell including an electrode having the nanocomposite as described above. Since the fuel cell does not need additional binder and ionomer to introduce a metal catalyst, conductivity is not decreased.

Figure 12:
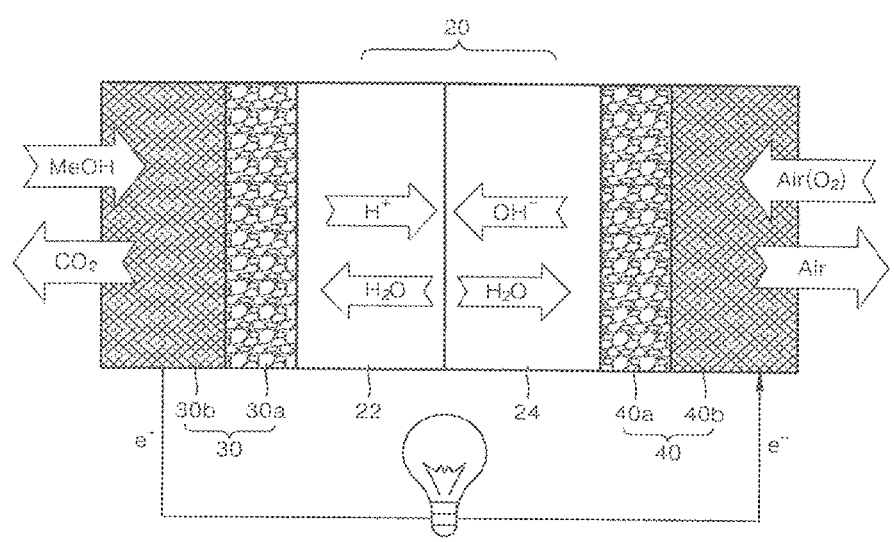
FIG. 12 is a schematic illustration of a direct methanol fuel cell according to an embodiment of the invention.

In one embodiment, as illustrated schematically in FIG. 12, a direct methanol fuel cell includes a polymer electrolyte membrane 20 comprising a cation conductive layer 22 and an anion conductive layer 24. An anode 30 includes a catalyst layer 30a comprising the nanocomposites described above, applied to an anode diffusion layer 30b. A cathode 40 similarly includes a catalyst layer 40a comprising the nanocomposites described above, applied to a cathode diffusion layer 40b. Together, the polymer electrolyte membrane 20, anode 30, and cathode 40 are referred to as a membrane electrode assembly (MEA). Methanol and air are applied to the anode and cathode, respectively. While a simple fuel cell is illustrated with just a single electricity generating unit, as is well-known to one of ordinary skill in the art, multiple units may be stacked together to form a fuel cell stack.

According to an embodiment of the present invention, the MEA can be prepared by disposing electrodes, each including the electrode catalyst layer described above, on both sides of the electrolyte membrane, assembling the electrode and the electrolyte membrane at a high temperature and under a high pressure, and assembling the corresponding fuel diffusion layers.

Assembly may be performed by heating the electrode and the electrolyte membrane to a temperature at which the electrolyte membrane is softened, and compressing the electrode and the electrolyte membrane at a pressure of 0.1 to 3 ton/cm$^2$. In one embodiment, the electrode and electrolyte membrane are compressed at a pressure of about 1 ton/cm$^2$.

In an embodiment, a fuel cell may then be prepared by installing bipolar plates on opposite sides of the MEA. The bipolar plates have grooves for supplying fuel and further function as current collectors.

According to an embodiment, the fuel cell is of the type that includes a polymer electrolyte membrane, but the present invention is not limited to such fuel cells.

The present invention will be described in further detail with reference to the following examples. These examples are for illustrative purposes only and are not intended to limit the scope of the present invention.

Example 1

Preparation of Carbon Nanofiber

First, polyacrylonitrile (PAN, Aldrich) was dissolved in N,N-dimethylformamide (DMF, Aldrich) solvent to prepare a 10 wt % solution and the solution was electrospun to prepare a carbon nanofiber precursor in a web form. The solution was electrospinned at a rate of 1 ml/hr, and 20 kV as optimized bias voltage was applied thereto, wherein the distance between electrodes (between a needle and a collector) was 15 cm, and a drum covered with an aluminum foil was used as the collector. The collector was rotated at 100 rpm. The needle had a diameter of 0.1 to 1 mm, and the electrospinning was performed at room temperature (electrospinning operation). FIG. 1 is a schematic diagram illustrating an electrospinning method.

Figure 2:
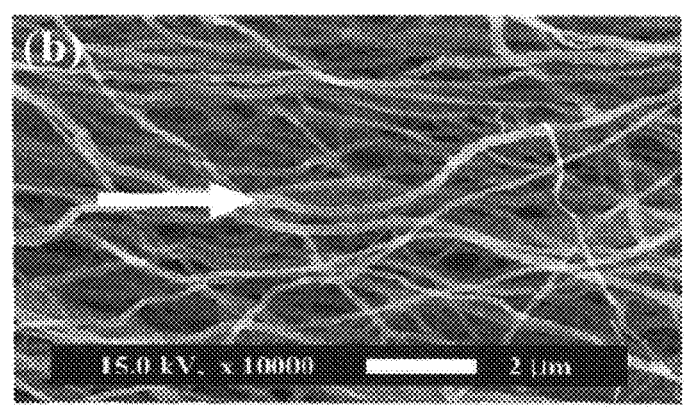
FIG. 2 is a scanning electron microscope (SEM) image of a nanofiber prepared according to Example 1 of the present invention.

The electrospun carbon nanofiber precursor in a web form was then stabilized in a furnace with a compressed air supply at 280° C. for 1 hour. A SEM image of the prepared carbon nanofiber is illustrated in FIG. 2.

The carbon nanofiber precursor (nanofiber) was then immersed in a 0.1 M KOH solution for 2 hours to hydrolyze the surface of the carbon nanofiber precursor. The hydrolyzed precursor was then washed with a 3 M HCl solution, and then with deionized water (hydrolysis operation).

Finally, the washed carbon nanofiber precursor was sintered in a furnace at 800° C. under Ar gas atmosphere for 1 hour to prepare a carbon nanofiber (sintering operation).

Example 2

Preparation of Nanocomposite

Figure 3:
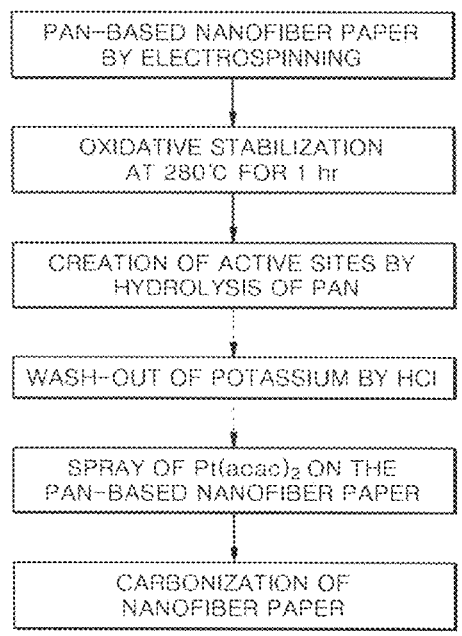
FIG. 3 is a flowchart illustrating a process of preparing a nanocomposite according to Example 2 of the present invention.

FIG. 3 is a flowchart illustrating a process for preparing a nanocomposite according to Example 2 of the present invention.

First, polyacrylonitrile (PAN, Aldrich) was dissolved in N,N-dimethylformamide (DMF, Aldrich) solvent to prepare a 10 wt % solution, and the solution was electrospun to prepare a carbon nanofiber precursor in a web form. The solution was electrospinned at a rate of 1 ml/hr, and 20 kV as optimized bias voltage was applied thereto, wherein the distance between electrodes (between a needle and a collector) was from 10 to 20 cm, and a drum covered with an aluminum foil was used as the collector. The collector was rotated at 100 rpm. The needle had a diameter of 0.1 to 1 mm, and the electrospinning was performed at room temperature (electrospinning operation).

The electrospun carbon nanofiber precursor in a web form was then stabilized in a furnace with a compressed air supply at 280° C. for 1 hour (stabilization operation).

The carbon nanofiber precursor was then immersed in a 0.1 M KOH solution at 50° C. for 2 hours to hydrolyze the surface of the carbon nanofiber precursor. The hydrolyzed precursor was then washed with a 3 M HCl solution, and then with deionized water (hydrolysis operation). As a result of the hydrolysis and washing, active sites were formed.

Then, platinum was applied by spraying 1 g of 0.01 M Pt (acetylacetonate)$_2$ solution on the carbon nanofiber precursor in a web form using a sprayer (Pt application operation).

Finally, the washed carbon nanofiber precursor was sintered in an electric oven under an Ar gas atmosphere at 800° C. for 1 hour to prepare a nanocomposite (sintering operation).

Figure 4:
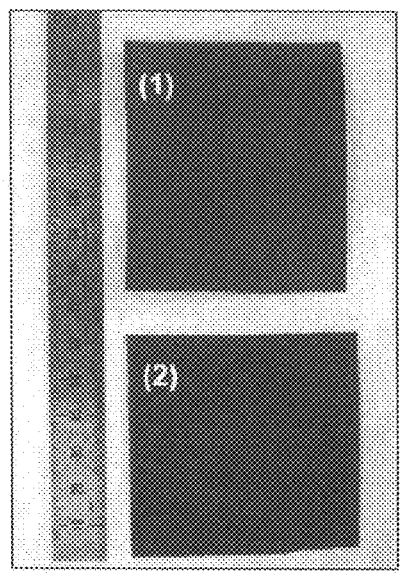
FIG. 4 is a photographic image of a nanocomposite in a web form before and after sintering.

The nanocomposite prepared in Example 2 has a web form since it is prepared by sintering the carbon nanofiber precursor in a web form. FIG. 4 is a photographic image of the nanocomposite according to Example 2 in a web form before (1) and after (2) the sintering process.

Example 3

A nanocomposite was prepared in the same manner as in Example 2, except that the carbon nanofiber precursor was immersed in a 0.1 M KOH solution at 30° C. for 2 hours to hydrolyze the surface of the carbon nanofiber precursor.

Example 4

A nanocomposite was prepared in the same manner as in Example 2, except that the carbon nanofiber precursor was immersed in a 0.1 M KOH solution at 40° C. for 2 hours to hydrolyze the surface of the carbon nanofiber precursor.

Example 5

A nanocomposite was prepared in the same manner as in Example 2, except that the carbon nanofiber precursor was immersed in a 0.1 M KOH solution at 60° C. for 2 hours to hydrolyze the surface of the carbon nanofiber precursor.

Comparative Example 1

Preparation of Nanocomposite

A nanocomposite was prepared in the same manner as in Example 2, except that the immersion of the carbon nanofiber precursor in a KOH solution to hydrolyze the surface of the carbon nanofiber precursor, and the washing of the hydrolyzed precursor with a HCl solution were not performed.

Comparative Example 2

Preparation of Carbon Nanofiber (without Hydrolysis)

A carbon nanofiber was prepared in the same manner as in Example 1, except that the hydrolysis operation was omitted.

Evaluation Example 1

SEM and TEM Images of Nanocomposite

Figure 5A:
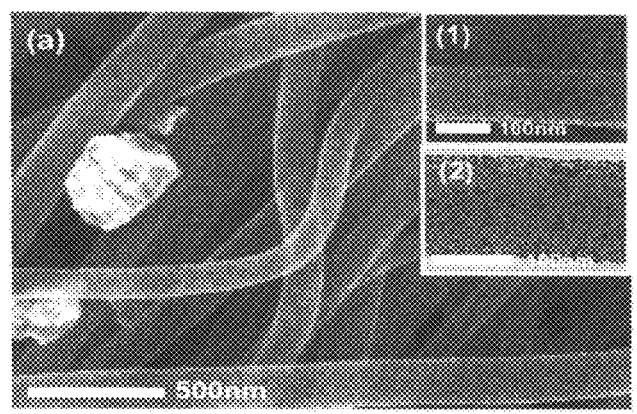
FIG. 5A is a SEM image (a) of a nanocomposite prepared according to Comparative Example 1 of the present invention, and more particularly a magnified SEM image (1) and transmission electron microscope (TEM) image (2)
Figure 5B:
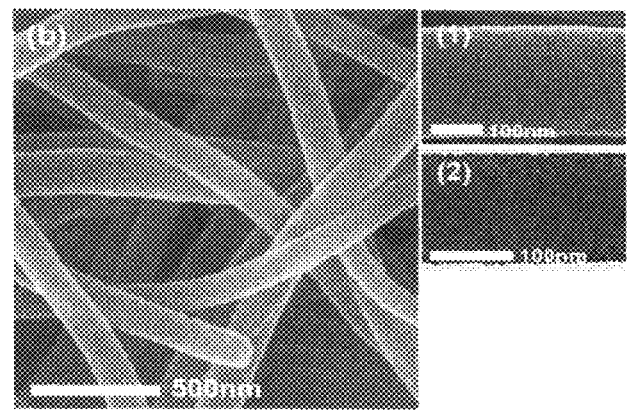
FIG. 5B is a SEM image (b) of a nanocomposite prepared according to Example 2 of the present invention, and more particularly a magnified SEM image (1) and TEM image (2)

A scanning electron microscope (SEM) image and a transmission electron microscope (TEM) image of the nanocomposite prepared in Example 2 and Comparative Example 1 are illustrated in FIGS. 5A and 5B.

FIG. 5A is a SEM image (a) of a nanocomposite prepared according to Comparative Example 1 of the present invention, and more particularly a magnified SEM image (1) and transmission electron microscope (TEM) image (2); FIG. 5B is a SEM image (b) of a nanocomposite prepared according to Example 2 of the present invention, and more particularly a magnified SEM image (1) and TEM image (2).

Referring to FIGS. 5A and 5B, while carbon nanofibers impregnated with uniform platinum nanoparticles are only shown in (b) of FIG. 5B, unreacted platinum compound agglomeration is found between the carbon nanofibers in (a) of FIG. 5A. Further, when TEM images (2) in FIGS. 5A and 5B are compared with each other, it is found that platinum nano particles of Example 2 illustrated in (2) of FIG. 5B are more compactly distributed on the surface of the carbon fiber, compared to that of Comparative Example 1 illustrated in (2) of FIG. 5A. With these results, it can be inferred that platinum particles of Example 2 are uniformly distributed on the surface of the carbon nanofiber, while platinum particles of Comparative Example 1 agglomerate failing to be uniformly distributed on the surface of the carbon nanofiber.

These differences may results from the fact that the surface of the carbon nanofiber of Example 2 has far more active sites to which platinum is attached than that of Comparative Example 1.

Evaluation Example 2: X-Ray Photoelectron Spectroscopy

Figure 6A:
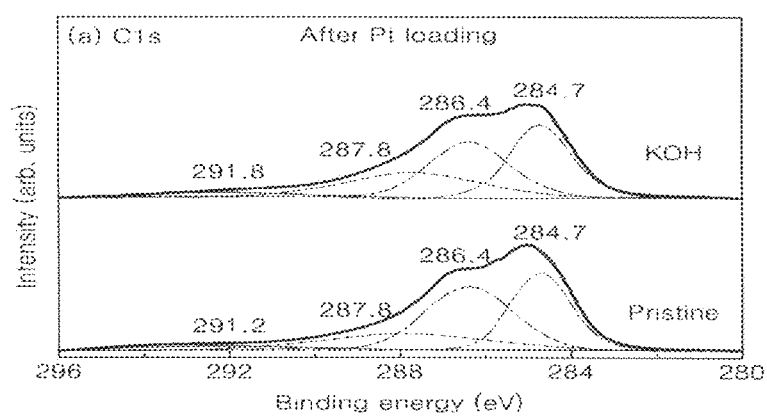
FIG. 6A is a graph illustrating X-ray photoelectron spectroscopy (XPS) of carbon atoms on the surface of a nanocomposite prepared according to Example 2 (KOH) and Comparative Example 1 (pristine) before sintering.
Figure 6B:
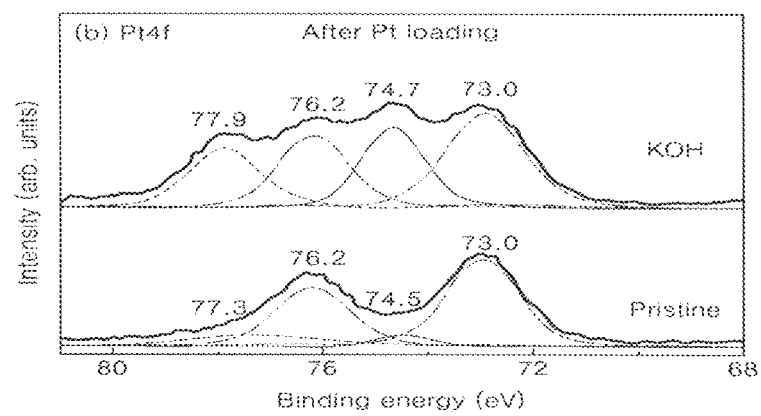
FIG. 6B is a graph illustrating XPS of platinum atoms on the surface of a nanocomposite prepared according to Example 2 (KOH) and Comparative Example 1 (pristine) before sintering.

X-ray photoelectron spectroscopy (XPS) of nanocomposites prepared according to Example 2 and Comparative Example 1 was measured, and the results are shown in FIGS. 6A and 6B.

In FIGS. 6A to 6D, the upper graph shown as KOH illustrates XPS results of a nanocomposite of Example 2 prepared by hydrolysis using a KOH solution, and the lower graph shown as "pristine" illustrates XPS results of a nanocomposite of Comparative Example 1 prepared without hydrolysis process.

Figure 6C:
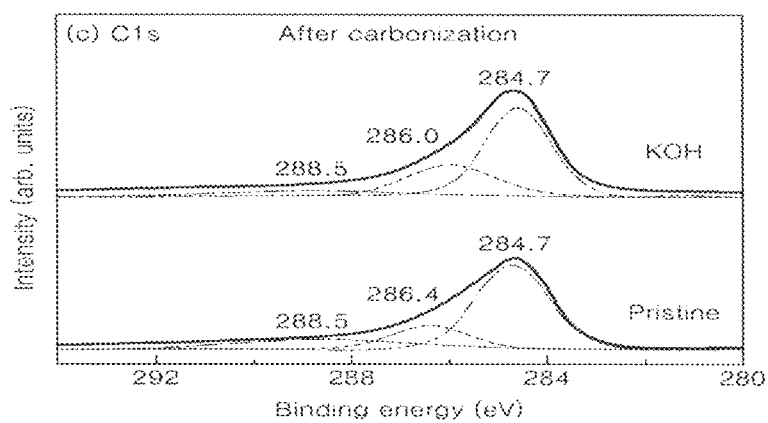
FIG. 6C is a graph illustrating XPS of carbon atoms on the surface of a nanocomposite prepared according to Example 2 (KOH) and Comparative Example 1 (pristine) after sintering.
Figure 6D:
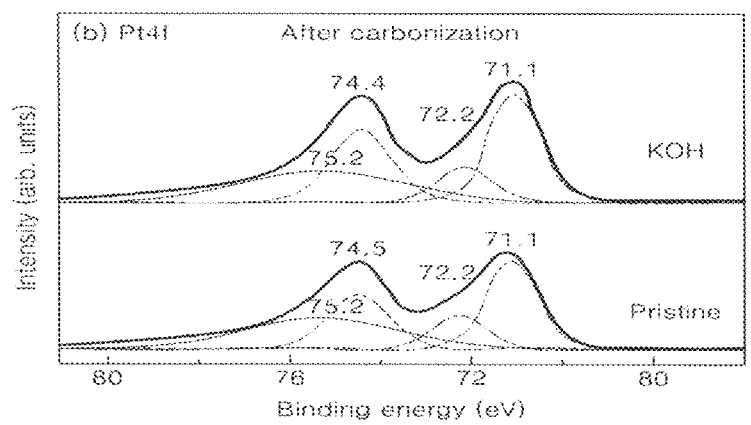
FIG. 6D is a graph illustrating XPS of platinum atoms on the surface of a nanocomposite prepared according to Example 2 (KOH) and Comparative Example 1 (pristine) after sintering.

FIGS. 6A and 6B are graphs illustrating XPS of nanocomposites before sintering, and FIGS. 6C and 6D are graphs illustrating XPS of nanocomposites after sintering. FIGS. 6A and 6C are graphs illustrating XPS of carbon atoms, and FIGS. 6B and 6D are graphs illustrating XPS of platinum atoms.

For the nanocomposite hydrolyzed using a KOH solution before sintering, a peak at 287.8 eV which represents carbon combined with oxygen as illustrated in the upper graph of FIG. 6A, and peaks at 74.7 and 77.9 eV represent platinum combined with oxygen as illustrated in the upper graph of FIG. 6B, are dramatically increased when compared with the nanocomposite prepared without hydrolysis using a KOH solution. That is, the amount of oxygen that is combined with carbon and platinum is dramatically increased.

These peaks that represent a combination with oxygen had no differences after sintering when compared with peaks without hydrolysis (FIGS. 6C and 6D). This indicated that defects were not generated on the surface of the nanocomposite after hydrolysis using a KOH solution.

Evaluation Example 3

Calculation of Oxygen Content on the Surface of Nanocomposite

Atomic percentages of oxygen, nitrogen and carbon were respectively calculated from areas of an oxygen peak, a nitrogen peak, and a carbon peak in X-ray photoelectron spectroscopy at each stage of Example 2 and Comparative Example 1, and oxygen content and nitrogen content on the surface of the carbon nanofiber were calculated using those atomic percentages through Formulae 1 and 2. The results are shown in Table 1.

Oxygen content=[atomic percentage of oxygen/atomic percentage of carbon].      Formula 1

Nitrogen content=[atomic percentage of nitrogen/atomic percentage of carbon].      Formula 2

TABLE 1

| | Comparative Example 1 Oxygen content | Comparative Example 1 Nitrogen content | Example 2 Nitrogen content | Example 2 Nitrogen content |
|---|---|---|---|---|
| Electrospinning | 0 | 0.33 | 0 | 0.33 |
| Stabilization | 0.23 | 0.32 | 0.23 | 0.32 |
| Hydrolysis | — | — | 0.27 | 0.32 |
| Platinum attachment | 0.23 | 0.25 | 0.27 | 0.24 |
| Sintering | 0.03 | 0.19 | 0.14 | 0.17 |

As shown in Table 1, the oxygen content was increased but nitrogen content was not changed during the hydrolysis in Example 2.

Consequently, the surface oxygen content of the nanocomposite of Example 2 according to an embodiment of the present invention was significantly increased to 0.14 after sintering, when compared to the surface oxygen content of 0.03 in Comparative Example 1.

Figure 7:
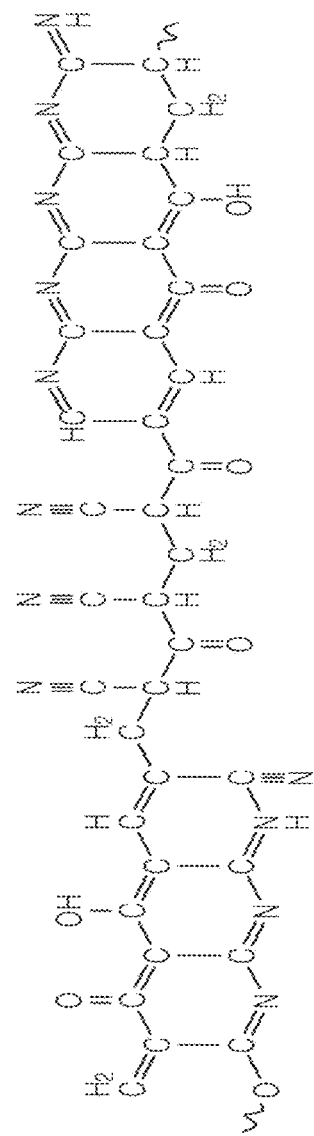
FIG. 7 is a chemical formula of a polymer backbone on the surface of a carbon nanofiber precursor after stabilization.

This result can be obtained since a nitrile group in a polyacrylonitrile (PAN) resin forms a ring by oxygen, and forms a functional group containing oxygen in a polymer backbone such as —OH, —C(=O)—, or the like (Jean-Baptiste Donnet, Tong Kuan Wang, Jimmy C. M. Peng, 'Carbon fibers' Third edition, 1998), and remaining nitrile groups are hydrolyzed using a KOH solution after the stabilization (John McMurry, 'Organic chemistry' Sixth edition, 2005). An expected structure of the polymer backbone after being stabilized in air is illustrated in FIG. 7.

Figure 8A:
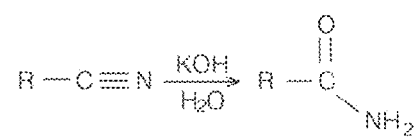
FIGS. 8A and 8B are reaction schemes illustrating mechanisms of hydrolysis.
Figure 8B:
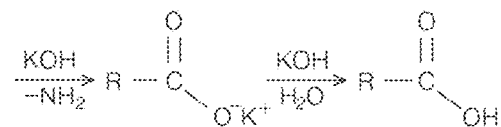

Reactions of a CN group with a KOH solution are illustrated in FIGS. 8A and 8B. Referring to FIG. 8A, a nucleophilic addition of an OH group to a carbon atom in the polar CN group produces an imine anion which reacts with water to produce an amide group. Referring to FIG. 8B, the reaction proceeds to detach $NH_2$ through hydrophilic addition of an OH group to an amide carbonyl group, and a $O^-K^+$ group is formed by producing a carboxylic acid anion. $K^+$ cation in the KOH solution functions to disconnect the carbon from the nitrogen in a stabilized PAN-based carbon nanofiber structure, or to form —OK, or =CK. Finally, the OK group turns into an OH group through a treatment process using a HCl solution to remove potassium ions. The hydrolysis using the KOH solution is dependent on reaction temperatures and time (Oya Sanli, Eur. Polym. J. 26, p 9 (1990)). Typically, a CN group is converted to a COOH in a KOH solution at 200° C. However, the KOH solution is treated at 50° C. in the present invention. Since the stabilized PAN-based carbon nanofiber cannot be maintained in a web form when the KOH solution treatment process is performed for a long time, an electrode cannot be formed.

Meanwhile, according to the XPS results of Table 1, while the nitrogen content has not changed, the oxygen content was increased. Thus, the reaction proceeded only to a stage illustrated in FIG. 8A, not to a stage illustrated in FIG. 8B. Referring to these results, it can be inferred that the active sites on which Pt is loaded are mainly formed by carbonyl groups.

Further, the surface of the carbon nanofiber precursor (a PAN-based carbon nanofiber) includes carbon, oxygen, nitrogen, and hydrogen. Since the electronegativity of carbon and oxygen is respectively 2.5 and 3.5, electrons are polarized to oxygen in functional groups including carbon and oxygen. When a platinum precursor is added thereto, the platinum with electronegativity of 2.2 tends to bond to oxygen.

Evaluation Example 4

Measuring Surface Electric Potential

The surface electric potentials of nanocomposites prepared according to Example 2 and Comparative Example 1 were measured before applying Pt.

The surface electric potentials of the nanocomposites prepared according to Comparative Example 1 and Example 2 were respectively −38 mV/cm and −192 mV/cm. Since a carbonyl group is formed by treating with the KOH solution in Example 2, wider surface are negative charged, and thus surface potential increases. The negative charges function as electrophilic sites, and thus become nucleation seeds for the application of Pt. As a results, wettability of nanofiber web increases according to the hydrolysis. Thus, when a solution containing Pt ions is added to the nanofiber web, the Pt ions are easily spread on the surface of the web.

Evaluation Example 5

Measuring FT-IR

FT-IR of nanocomposites prepared according to Example 2 and Comparative Example 1 was measured at each stage (stabilization, hydrolysis and platinum attachment). The changes are respectively illustrated in the graphs of FIGS. 9A and 9B. Then, a relative amount of an active site at which platinum is combined was calculated at each stage using a peak area at 1000 to 1800 $cm^{-1}$ illustrated in the graphs of FIGS. 9A and 9B. The results are shown in Table 2.

TABLE 2

| | Relative area (at 1000 to 1800 $cm^{-1}$) | | | Change in area |
|---|---|---|---|---|
| | Stabilization | Hydrolysis | Platinum attachment | before and after platinum attachment |
| Comparative Example 1 | 1 | — | 0.86 | 0.14 |
| Example 2 | 1 | 1.19 | 0.84 | 0.35 |

Figure 9A:
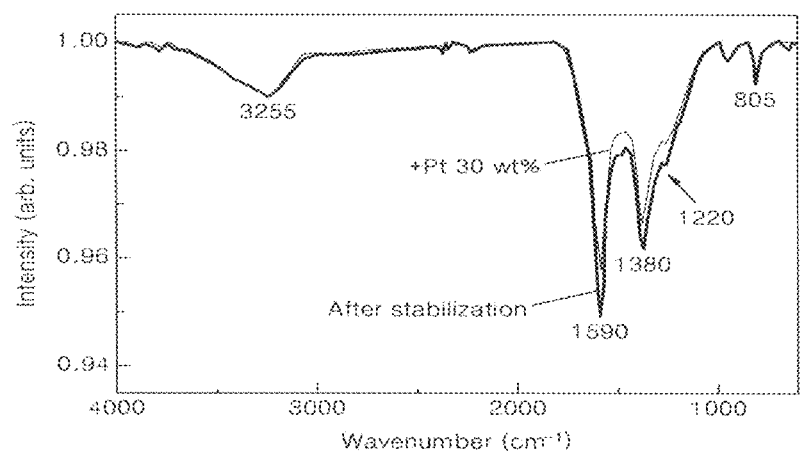
FIG. 9A is a graph illustrating an IR spectrum of each stage of preparing a nanocomposite according to Comparative Example 1.
Figure 9B:
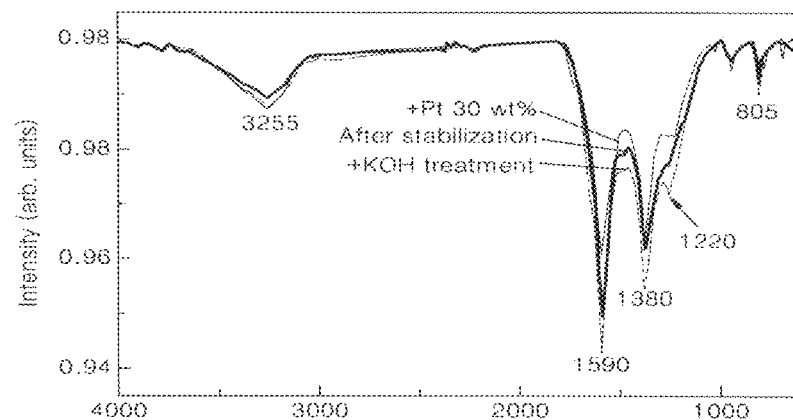
FIG. 9B is a graph illustrating an IR spectrum of each stage of preparing a nanocomposite according to Example 2.

Referring to FIG. 9A which is a graph illustrating an IR spectrum of each stage of preparing a nanocomposite according to Comparative Example 1, the amount of functional groups (C=O, C—N, C=C, etc.) was reduced at 1000 to 1800 $cm^{-1}$ after platinum attachment. Referring to FIG. 9B which is a graph illustrating an IR spectrum of each stage of preparing a nanocomposite according to Example 2, a peak increased slightly at 3000 to 2500 $cm^{-1}$, which represents the OH group of the carboxylic acid after a KOH treatment and the amount thereof did not change after Pt loading. In addition, the amount of the functional groups was increased at 1000 to 1800 $cm^{-1}$ after the KOH solution treatment and reduced after Pt loading. Thus, it is considered that the carbonyl groups in these areas function as active sites at which Pt is combined, but the hydroxyl groups do not. An area after the stabilization was set to 1, and each of the values shown in Table 2 was relatively calculated using the same. Since the area after Pt loading without the KOH solution treatment was reduced by 0.14, it can be considered that the amount of the active sites is 0.14. Since the area after Pt loading with the KOH solution treatment was reduced by 0.35, it can be considered that the amount of active sites is 0.35. Accordingly, the amount of active sites with the KOH solution treatment is increased by 2.2 times compared to that without the KOH solution treatment.

Evaluation Example 6

Measuring Particle Size Distribution According to Hydrolysis Temperature

Figure 10A:
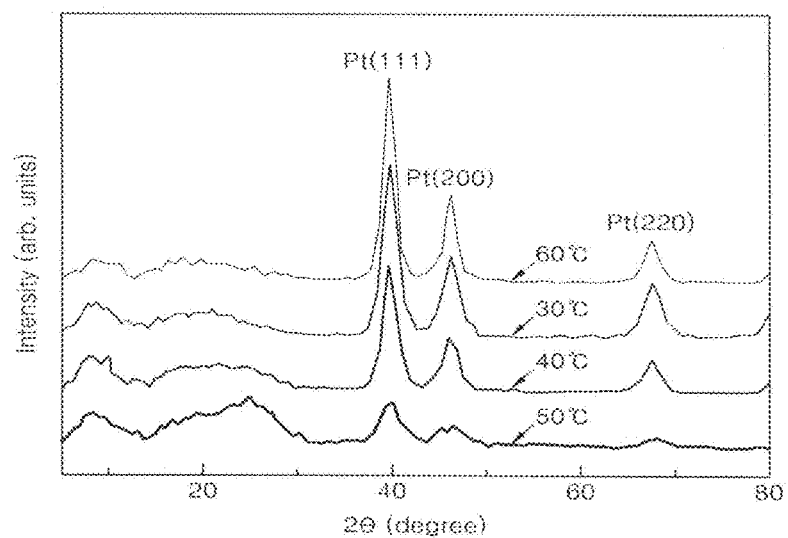
FIG. 10A is a graph illustrating an XRD spectrum of a nanocomposite according to a hydrolysis temperature.

XRD of a nanocomposite prepared according to Examples 2 through 5 was measured, and the results are shown in the graph of FIG. 10A. An average particle size of loaded platinum was calculated using XRD results through Scherrer's equation and shown in the graph of FIG. 10B. Further, the particle size of platinum obtained by the TEM analysis of the nanocomposites of Examples 2 through 5 is shown in the graph of FIG. 10C.

Figure 10B:
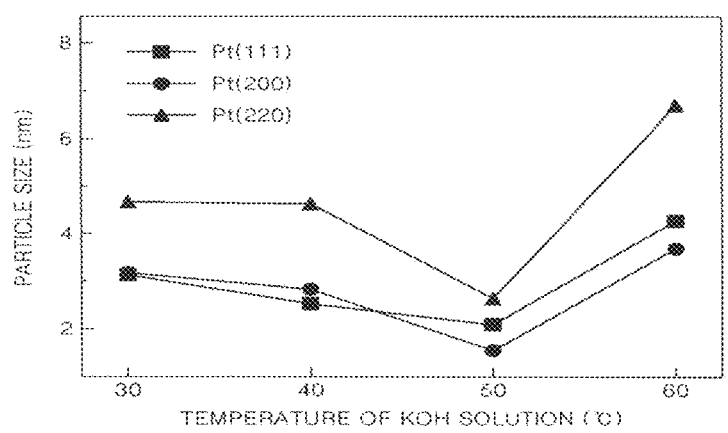
FIG. 10B is a graph illustrating an average particle size of platinum according to a hydrolysis temperature calculated from an XRD spectrum.
Figure 10C:
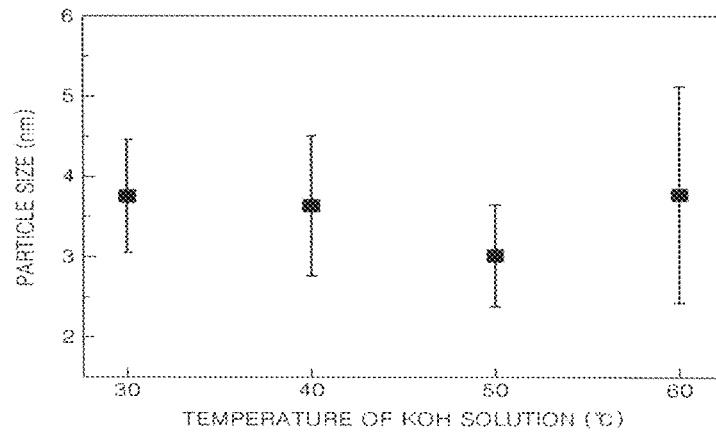
FIG. 10C is a graph illustrating the distribution of particle size of platinum according to a hydrolysis temperature calculated from a TEM image.

As illustrated in FIGS. 10B and 10C, the average particle size of Pt and its distribution decreased as the KOH solution temperature increased, and had the lowest value at 50° C. The average particle size and the standard deviation increased again as the KOH solution temperature increased to 60° C. As the particle size and the standard deviation of the metal catalyst decreased, the metal catalyst particles are more widely and uniformly distributed. Thus, to obtain optimized catalyst efficiency, the temperature of the KOH solution may be set to about 50° C.

Evaluation Example 7

Measuring Efficiency of Nanocomposite Using Cyclic Voltametry

Figure 11:
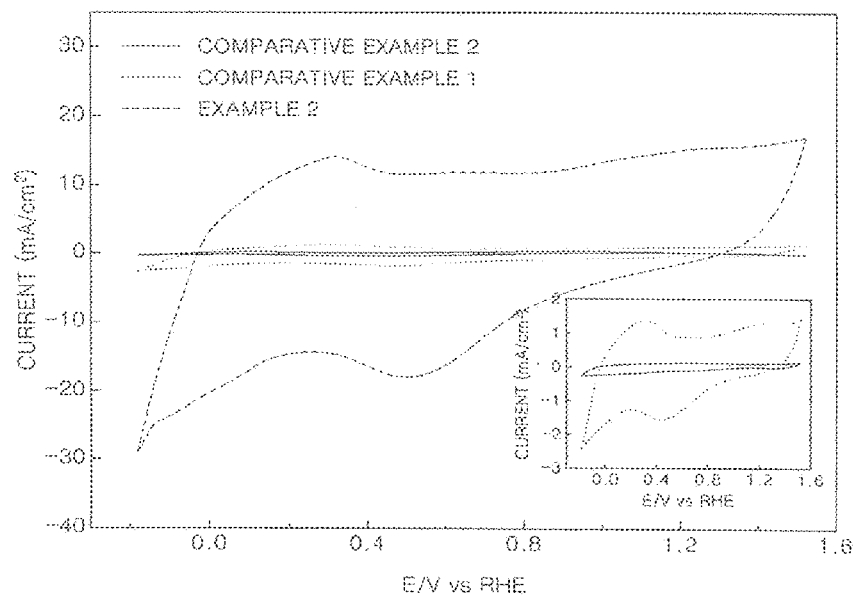
FIG. 11 is a graph of cyclic voltametry illustrating catalyst activity to web prepared according to Example 2, and Comparative Examples 1 and 2.

Current was measured between −0.2 and 1.5 V of hydrogen reference electrode at a scanning rate of 50 mV/s in 1 M $H_2SO_4$ solution using the nanocomposite web or nanofiber web prepared in Example 2, Comparative Examples 1 and 2 as operating electrodes, and the results are shown in FIG. 11.

As shown in FIG. 11, oxidation current of the nanocomposite prepared in Comparative Example 1 to which Pt was applied increased up to 1.4 $mA/cm^2$, which is higher than the current of the nanofiber prepared in Comparative Example 2 to which Pt was not applied. The oxidation current of the nanocomposite prepared in Example 2 to which Pt was applied after the hydrolysis increased up to 14 $mA/cm^2$, which is about 10 times as high as the oxidation current of Comparative Example 1. The current increased since the number of active sites to which hydrogen reacts increased due to uniformly monodispersed Pt nano particles. Accordingly, efficiency of fuel cells can be improved due to excellent electrochemical efficiency.

The nanocomposite according to the present invention has high surface oxygen content and has metal catalyst nano particles densely and uniformly distributed on the outer wall of the carbon nanofiber, thereby having high electrochemical efficiency. Thus, efficiency of fuel cells can be improved using the nanocomposite of the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing a carbon nanofiber for a fuel cell electrode, the method comprising:

hydrolyzing a surface of a carbon nanofiber precursor with a hydroxide solution having a concentration from 0.05-1 M to form a hydrolyzed carbon nanofiber precursor;

washing the hydrolyzed carbon nanofiber precursor with a hydrochloric acid solution to form a washed carbon nanofiber precursor; and sintering the washed carbon nanofiber precursor to obtain a carbon nanofiber, and wherein the carbon nanofiber is part of the fuel cell electrode.

2. The method of claim 1, wherein the carbon nanofiber precursor is prepared using an electrospinning method.

3. The method of claim 1, further comprising stabilizing the carbon nanofiber precursor by heat-treatment at a temperature between 200 and 300° C. under an oxygen-containing atmosphere for 1 to 2 hours prior to the hydrolyzing.

4. The method of claim 1, wherein the carbon nanofiber precursor comprises at least one polymer selected from the group consisting of a polyacrylonitrile-based polymers, acryl-based polymers, pitch-based polymers, and phenol-based polymers.

5. The method of claim 1, wherein the concentration of the hydroxide solution is from 0.05 to 0.5 M.

6. The method of claim 1, wherein the temperature of the hydroxide solution is between 30 and 60° C.

7. The method of claim 1, wherein the hydrolyzing of the surface of the carbon nanofiber precursor is performed for from 10 minutes to 10 hours.

8. The method of claim 1, wherein the hydroxide solution comprises a hydroxide compound of the formula of MOH, where M is at least one metal selected from the group consisting of Group IA, Group IIA, Group IIIA, Group IVA, Group VA, Group VIA, Group VIIA, Group VIII, Group IB, Group IIB and Group IIIB elements.

9. The method of claim 1, wherein the hydroxide solution is a solution selected from the group consisting of KOH, LiOH, NaOH, and combinations thereof.

10. The method of claim 1, wherein the concentration of the hydrochloric acid solution is from 0.01 to 5 M.

11. The method of claim 1, wherein the sintering is performed in an inert atmosphere and at a temperature between 500 and 1500° C.

* * * * *